(12) United States Patent
Geber et al.

(10) Patent No.: US 6,822,560 B2
(45) Date of Patent: Nov. 23, 2004

(54) COMPONENT REPLACEMENT WARNING SYSTEM

(75) Inventors: Michael Geber, Bad Urach (DE);
Juergen Hubrig, Ravensburg (DE);
Joern-Marten Ohle, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/378,685

(22) Filed: Mar. 5, 2003

(65) Prior Publication Data

US 2003/0193398 A1 Oct. 16, 2003

(30) Foreign Application Priority Data

Mar. 5, 2002 (DE) .......................................... 102 09 766

(51) Int. Cl.$^7$ ................................................ B60Q 1/00
(52) U.S. Cl. ..................... 340/439; 340/426.1; 340/5.8; 340/568.1; 307/9.1
(58) Field of Search ........................... 340/426.1, 425.5, 340/539.24, 539.23, 539.1, 10.1, 10.4, 426.34, 426.16, 5.1, 5.3, 5.31, 5.8, 5.61, 5.86, 568.1; 701/31, 32, 36, 33; 307/9.1, 10.1, 10.2

(56) References Cited

U.S. PATENT DOCUMENTS

| | | | | |
|---|---|---|---|---|
| 4,494,114 | A | * | 1/1985 | Kaish .......................... 340/5.31 |
| 4,743,894 | A | * | 5/1988 | Bochmann ................ 340/691.5 |
| 5,235,687 | A | * | 8/1993 | Bacot et al. ................. 711/165 |
| 5,349,326 | A | * | 9/1994 | Yamada ................... 340/426.34 |
| 5,371,743 | A | * | 12/1994 | DeYesso et al. .............. 714/10 |
| 6,288,634 | B1 | * | 9/2001 | Weiss et al. ............ 340/426.24 |

FOREIGN PATENT DOCUMENTS

| | | |
|---|---|---|
| DE | 29 19 753 | 11/1980 |
| DE | 33 13 481 | 10/1984 |
| DE | 44 29 420 | 2/1996 |
| DE | 195 41 742 | 4/1997 |
| DE | 199 59 615 | 6/2001 |
| DE | 100 15 307 | 10/2001 |

\* cited by examiner

*Primary Examiner*—Donnie L. Crosland
(74) *Attorney, Agent, or Firm*—Crowell & Moring LLP

(57) ABSTRACT

Component replacement warning system for a transportation mechanism, which monitors the unauthorized removal or installation of a component (2) of the transportation mechanism, wherein the component replacement warning system (1) include a first communication device (3) that is firmly connected to the transportation mechanism, a second communication device (7) that is connected to the component (2), and an electronic authorization verification device that checks whether a component (2), which is connected to the second communication device (7) is installed in the transportation mechanism provided therefor in an authorized fashion. One of the communication devices is a transponder, which transmits a test signal (5) to the other communication device (7 or 3), wherein the other communication device (7 or 3) derives energy from the electromagnetic test signal (5) and generates a test response signal (6) for the transponder (3) so that the electronic authorization verification device detects the unauthorized removal or the installation of an unauthorized component (2), and wherein a warning/actuating device either blocks the component (2) that is installed in the transportation device with regard to its function or transmits an alarm signal.

18 Claims, 1 Drawing Sheet

COMPONENT REPLACEMENT WARNING SYSTEM

BACKGROUND AND SUMMARY OF THE INVENTION

This application claims the priority of German Application No. 102 09 766.6, filed Mar. 5, 2002, the disclosure of which is expressly incorporated by reference herein.

The invention relates to a component replacement warning system for a transportation device, which monitors the unauthorized removal or installation of a component the transportation device, wherein the component replacement warning system includes a first communication device that is firmly connected to the transportation device, a second communication device that is connected to the component, and an electronic authorization verification device that checks whether a component which is connected to the second communication means is installed in the means of transportation provided therefor in an authorized fashion.

Safety functions and comfort functions in transportation device are implemented increasingly with electrical or electronic control devices and the appropriate sensors and actuators. For example, in motor vehicles, control devices for airbag functions and an airbag as corresponding actuator are provided. With regard to the comfort functions as well, motor vehicles are equipped with complex electronic systems, which are fixedly installed in the motor vehicles during manufacturing, but can be replaced as complete modules in a repair shop if they fail. Due to the costs for such complicated comfort and safety systems, there is an increase in the number of incidents where entire electronic components are removed from the means of transportation by unauthorized persons, for example in the event of a theft, and are installed in other vehicles involved in accidents or in stolen vehicles. In contrast to conventional theft warming systems and alarm systems, which prevent the theft of the entire vehicle, the component replacement warning system protects additionally only individual components that are fixedly installed in the vehicle. This prevents the replacement of components that are critical for safety reasons and whose incorrect installation leads to subsequent damage.

German Patent DE 195 41 742 C1 discloses a theft warning device for protecting the entire motor vehicle. The theft warning device contains a radio link via which, for example, the theft of the vehicle is automatically reported to a receiver, for example a mobile telephone. The receiver additionally contains a signal interface, allowing a central monitoring station to be informed automatically in case of vehicle theft. In the disclosed embodiment, a vehicle located in a parking lot or a parking garage is monitored for theft by the attendant's booth, and information about the theft is also forwarded in parallel to the vehicle owner. A warning system for monitoring individual components that are fixedly installed within the motor vehicle is not described in the above-mentioned patent document.

German Patent DE 33 13 481 C2 discloses a device for marking and identifying motor vehicles, wherein a high frequency transmitter emits electromagnetic waves, which are received by an electronic module that is attached for example to the vehicle floor. The electronic module self-destructs in the event of unauthorized interference or removal and contains a high frequency receiver with an antenna so that the electromagnetic waves are converted into supply voltage for the components of the electronic module, allowing electronic data to be read and restored. An additional electric current supply for the electronic module is therefore not required. The electronic module stores specific vehicle data before its production and specific vehicle data during and after its production. By means of additional search functions, a targeted identification of the vehicles in the individual manufacturing stages is possible and marking of the vehicle also allows for plant-internal control during production, assembly and in the distribution of the components.

The high frequency transmitter is a transponder, which transmits, on the one hand, electromagnetic waves in order to make available a read or write requirement and simultaneously the energy supply for the electronic module that is attached to the vehicle. The electronic module stores production data during manufacturing of the vehicle. The patent document does not describe an alarm system that would be triggered upon replacement of special components, but it discloses, instead, a documentation system during the production, maintenance and use of the vehicle.

German Patent DE 29 19 753 describes a device for automatically identifying objects with a stationary interrogation unit and a response unit that is attached to the object. Various fields of application are provided for the device for the automatic identification of objects pursuant to the description. Apart from identifying animals and documents, it also describes the application in forgery-proof vehicle identifications. A stationary transmitter transmits an interrogation signal, whereupon an electronic component arranged in the identification transmits the stored identification data back to the stationary transmitter and receiver units. It also provides for vehicle data to be stored in the electronic component. If the electric component in the identification does not transmit any data or transmits erroneous data back to the transponder, a forgery of the identification or theft of the identification can be assumed. It also involves a documentation system where the identification or vehicle data in the electronic component is stored on the identification. Beyond that, the identification is a component that is attached on the exterior of the vehicle after production, which is replaced multiple times during the life of the vehicle when the vehicle owner changes.

It is the object of the present invention to provide a component replacement warning system for components that are installed within a means of transportation during manufacturing, wherein the system detects the unauthorized removal or installation of a component and generates a warning signal or prevents the components from being cleared.

The object is attained by a communication means configured as a transponder that emits a test signal to the other communication means, wherein the other communications means obtains energy from the electromagnetic test signal and generates a test response signal for the transponder so that the electronic authorization verification device detects the unauthorized removal or installation of an unauthorized component and a warning device either blocks the component installed in the means of transportation with regard to its function or transmits an alarm signal.

Pursuant to the invention, by monitoring the means of transportation with a transponder, a detection is made as to which components are installed within the means of transportation. The transponder transmits electromagnetic waves so that a communication means that is connected to a component can return a response signal, which is then received by the receiver of the transponder. As a result, a communication is transmitted which, on the one hand, provides an opening code that permits only an authorized inquiry of the component data, and, on the other hand, a code word is transmitted to the component, whereby a conclusion can be made as to the means of transportation in which the component is installed.

At the manufacturer, the component is programmed from the start with information based on which permissible or unauthorized installation in a means of transportation can be determined. The component then detects whether it has been installed in the authorized means of transportation, for example the original vehicle. Should the component have been installed in another means of transportation, the component and/or the electronic authorization verification device of the component detects the erroneous or unauthorized installation during the inquiry with a transponder containing the code of a wrong vehicle. The electronic authorization verification device of the component can then prevent the functional release of the component by not allowing it to be electrically disconnected. On the other hand, a portion of the electronic authorization verification device can emit a warning function, that is, an alarm signal or diagnostic data for a monitoring system. This alarm system can then be evaluated for example by insurance companies, the police, or also the vehicle manufacturer.

Generally, the transponder is fastened to the vehicle body and an electronic component with the second communication means is fixedly attached to the component. In the case of components with their own power supply, however, it is also possible to provide the transponder on the component and to emit the test response signal from the communication means on the means of transportation. If the transponder is defective, it is possible to integrate a new transponder only through a special diagnostic function in the component or on the transponder. For this purpose, a special authorization administration function is required on the component or on the transponder.

An alternative component replacement warning system contains electrical lines or a data bus between the component to be monitored and a safety component so that test and test response signals can be transmitted via the electrical or also optical lines. If a component is newly installed into another means of transportation, a test signal is sent from the component for release purposes and the component is then cleared due to the test response signal from the safety component. Since the safety component can only be removed from the means of transportation by destroying it, it will not be possible to install the safety component into a different means of transportation. If an unauthorized installation of the component into another means of transportation is attempted, the test response in the other means of transportation will either not occur at all or will occur via an unauthorized safety component so that the system cannot be cleared and/or an alarm signal can be sent, such as the hazard flashers.

A particular advantage of the invention is that the frequently occurring cases of component replacement within the means of transportation can be prevented. Particularly the safety systems in motor vehicles, such as airbag systems, cannot just be removed in an effort to obtain replacement parts or during vehicle theft and be re-installed in stolen vehicles without further control. In this way, the theft protection system within a motor vehicle cannot be simply circumvented by disassembling a component of the alarm system. Component replacements are thus prevented, the theft of electrical components of new vehicles is eliminated, and an improved anti-theft protection with regard to safety-critical and high-value components created within the vehicle is created. Furthermore, it also offers protection against defective installation of the components relevant to safety.

In a beneficial further development of the invention, the transponder or the electronic authorization verification device can be disassembled or removed from the means of transportation only by its destruction. The transponder is preferably mechanically fastened to one area of the body in the means of transportation in such a way that the removal of the transponder leaves behind visible traces on the means of transportation. In this way, the transponder is fixedly allocated on the chassis of the means of transportation, so that information regarding the vehicle chassis number can be firmly burned, for example, into an EPROM. If the component is now programmed for cooperation with this special transponder, it can be cleared and a regular operation of the component can take place. The component can be, for example, a control device for an airbag system or a control device for engine electronics.

The electronic authorization verification device can be arranged together with the communication means on a microchip on the installed component. Apart from the electronic authorization verification device the microchip also contains an oscillating circuit. The oscillating circuit is excited by the electromagnetic waves of the transponder so that energy is available for operating the microchip. The electronic authorization verification device is activated and then generates a response signal for the transponder. In parallel thereto, a clearance of the component can be provided when an authorized transponder is detected. The microchip can then either generate an electromagnetic signal, which attenuates the output signal on the transponder in a certain frequency range so that it leads to a characteristic attenuated response signal. On the other hand, the microchip can also transmit a code word back to the transponder so that, based on the code word, an authorization process can be performed on the system.

The inductive means of the oscillating circuit however can also be provided outside the microchip. The coil of the oscillating circuit can be connected, for example, via electrical connecting lines to the electric microchip on the component so that the coil is arranged on the vehicle body next to the transponder and is connected to the component in an electrically conductive manner. When the electrical lines are interrupted, a component replacement is detected in the transponder. On the other hand, the microchip can be arranged together with the coil on the outside of the component and be arranged in the area of the transponder when the component is installed.

There are various possibilities for advantageously configuring and further developing the idea of the present invention. For this purpose, reference should be made to the following description of an embodiment.

Other objects, advantages and novel features of the present invention will become apparent from the following detailed description of the invention when considered in conjunction with the accompanying drawings.

BRIEF DESCRIPTION OF THE DRAWINGS

The drawing depicts an embodiment of the component replacement warning system for simulation purposes. In schematic representation are shown.

DETAILED DESCRIPTION OF THE PREFERRED EMBODIMENTS

Figure 1:
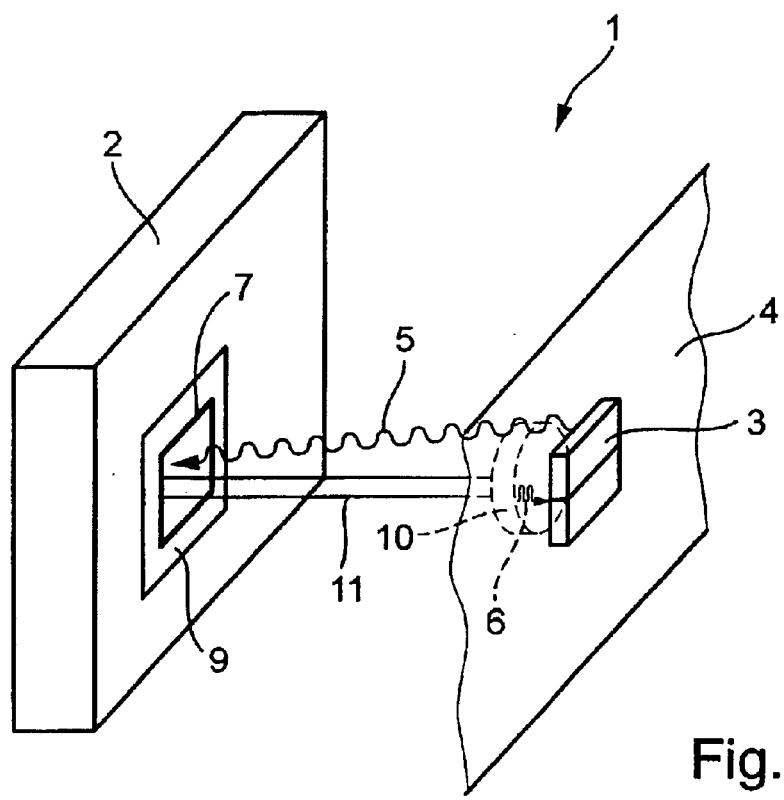
FIG. 1 is a schematic design of a first embodiment of a component replacement warning system installed in a means of transportation and including a coil mounted directly to the transponder.

The component replacement warning system 1 is installed in a motor vehicle, detects the unauthorized removal or installation of a component 2 from or into a means of transportation that is not provided therefor and shuts the component 2 down electronically or generates a warning signal, for example, an alarm signal or an electronic message for a central monitoring station. The component warning system 1 comprises a first communication means 3, which is fixedly connected to the vehicle body. It has been installed in such a way that a removal of the communication means 3 is possible only by destroying the body 4 in the surroundings of the communication means 3. The communication means 3 is a so-called transponder which, on the one hand, emits signals in the form of electromagnetic waves 5 and, on the other hand, receives response signals 6. The second communication means 7, which is fixedly connected to the component 2, generates the response signal 6 based on the electromagnetic waves 5 of the transponder 3 and simultaneously by means of an oscillating circuit 8 obtains the energy that is required for returning the response 6 from the electromagnetic waves 5.

In the first embodiment pursuant to FIG. 1, a microchip 9 is provided on the component 2, wherein the coil 10 of the oscillating circuit 8 is arranged adjacent to the transponder 3 on the vehicle body 4. Electrical lines 11 connect the coil 10 to the microchip 9, so that an installed component 2 is detected when the electrical lines 11 between the coil 10 and the microchip 9 are connected in an electrically conductive manner. When the transponder 3 emits its electromagnetic waves 5 in the direction of the coil 10 of the microchip 9, the electronic authorization verification device generates a response signal 6 on the microchip 9, which allows verification in the transponder 3 that the component 2 can be installed in the respective motor vehicle. On the other hand, the electronic authorization verification device on the microchip 9 of the component 2 also allows verification that the component 2 in the respective motor vehicle can be cleared.

The component replacement warning system 1 functions based on a method where the transponder 3 transmits a test signal to the communication means 7 on the component 2, wherein the communication means 7 on the component 2 obtains the necessary energy from the electromagnetic waves 5 with the test signal of the transponder 3 for generating a test response signal 6 for the transponder 3. The test response signal 6 is then transmitted back to the transponder 3 so that the installation of a new component 2 in the means of transportation, the installation authorization, and the component type can be verified. The electronic authorization verification device detects the authorized removal of the component 2 from the vehicle or its installation into another unauthorized motor vehicle, and the component 2 installed in the means of transportation can self-lock in the event of an erroneous installation, or the transponder 3 generates a warning signal for a diagnostic or monitoring system.

The transponder 3 is mechanically fastened in a central location of the motor vehicle, for example in the area of the body 4, in such a way that it can be removed only by destroying it. In this embodiment, the coil 10 of the oscillating circuit 8 is provided for selecting the microchip 9 located on the component 2. As soon as the microchip 9 detects an interruption in the electrical lines 11 to the coil 7, an unauthorized state of the component 2 in the motor vehicle is detected.

Figure 2:
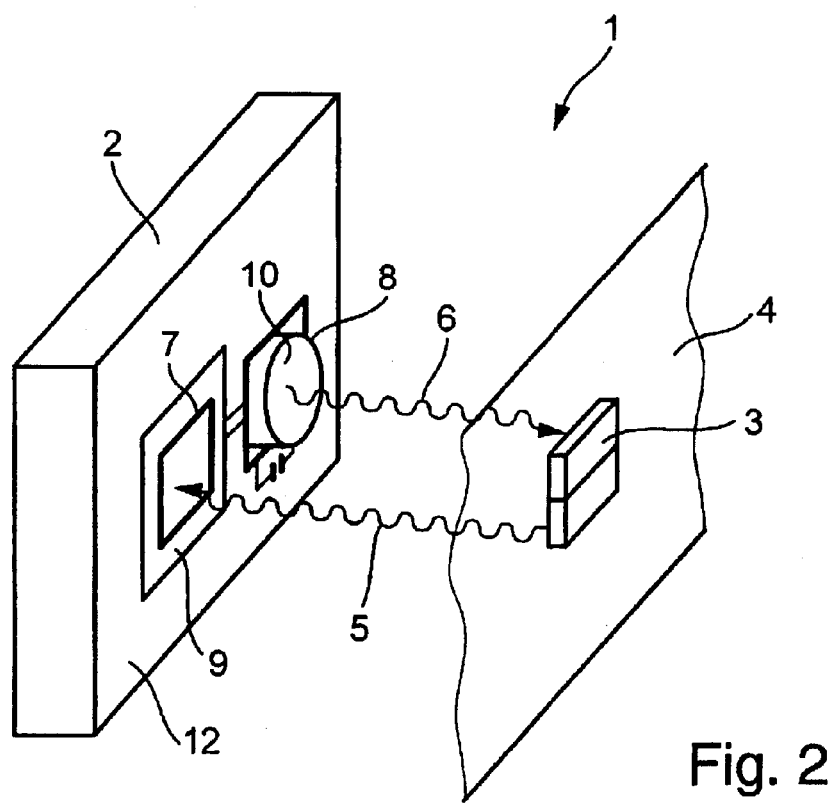
FIG. 2 is a schematic of another embodiment of a component replacement warning system with a coil provided on the component and the transponder of the means of transportation arranged at a distance thereto.

FIG. 2 depicts a second embodiment of the component replacement warning system 1. The transponder 3 is installed in its entirety in the vehicle body 4, and the coil 10 is arranged on the component 2 together with the microchip 9. In the assembled state, the coil 10 is located in the vicinity of the transponder 3 so that the microchip 9 can obtain its energy for computing and returning the test response signal 6 from the electromagnetic field 5 of the transponder 3. The microchip 9 can be arranged within or outside the component 2 in the area of the wall 12 of the component 2 and can be smaller than the head of a pin. A decisive advantage of the component replacement warning system 1 is that the electronic microchip 9 is independent from the power supply of the component 2 since it derives the electrical energy from the electromagnetic field 5 of the transponder 3.

The test response signal 6 of the microchip 9 can be provided in such a way that in the test signal 5 on the transponder 3 certain frequencies are heavily attenuated and the existence of the authorized component 2 is detected from this characteristic attenuating field. In another embodiment of the present invention, the transponder 3 generates an encoded signal, based on which the transponder type or the motor vehicle can be specifically detected. The microchip 9 with the electronic authorization verification device can then detect, based on the received signal 6, whether the component 2 is installed in the motor vehicle for which the component 2 was intended. If the component 2 is not installed in an authorized motor vehicle, either a warning signal for a service center, an alarm signal, a drive-away block, or a diagnostic signal can be generated. The component replacement warning system 1 can also be programmed in such a way that a component 2 can be installed into a certain group of motor vehicles so that one component 2 can be used, respectively, for a certain number or group of motor vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component replacement warning system for a means of transportation, which monitors unauthorized removal or installation of a component of the means of transportation, wherein the component replacement warning system comprises:

a first communication means firmly connected to the means of transportation;

a second communication means connected to the component; and an electronic authorization verification device that checks whether said component is installed in the means of transportation provided therefor in an authorized fashion, wherein one of said first and second communication means is a transponder, which transmits a test signal to another one of said first and second communication means, wherein said another communication means derives energy from the electromagnetic test signal and generates a test response signal for the transponder so that the electronic authorization verification device detects an unauthorized removal of said component or an installation of an unauthorized component, and wherein a warning/actuating device either blocks the component that is installed in the means of transportation with regard to its function or transmits an alarm signal.

2. A component replacement warning system for a means of transportation, which monitors the unauthorized removal or installation of a component of the means of transportation, wherein the component replacement warning system comprises;

a first communication means firmly connected to the means of transportation;

a second communication means connected to the component; and an electronic authorization verification device that checks whether said component, is installed in the means of transportation provided therefor in an authorized fashion, wherein one of said first and second communication means is a safety component, which can only be removed from the means of transportation by destroying it, and which receives a test signal from another one of said first and second communication means and generates at least one test response signal, wherein there is an electrical or optical connection between the component and the safety component in order to transmit the at least one test response signal whereby the electronic authorization verification device detects the unauthorized removal or the installation of an unauthorized component and a warning/actuating device either blocks functioning of the unauthorized component that is installed in the means of transportation, does not authorize said component, or transmits an alarm signal.

3. The component replacement warning system of claim 1, wherein at least one of the transponder and the electronic authorization verification device can be removed from the means of transportation only by destroying said transponder.

4. The component replacement warning system of claim 1, wherein a microchip is arranged on the component, said microchip having an electronic authorization verification device and a communication means whereby, as a function of the test signal, a determination is made as to whether the transmitting transponder or the safety component is the transponder or whether the safety component is authorized for the means of transportation.

5. The component replacement warning system of claim 1, wherein the transponder transmits said test signal with a transponder recognition and wherein the electronic authorization verification device that is assigned to the component determines whether the transponder recognition agrees with the transponder recognition registered as being authorized.

6. The component replacement warning system of claim 1, wherein the communication means connected to the component contains an inductive device, which includes an oscillating circuit which generates an electromagnetic signal.

7. The component replacement warning system of claim 5, wherein the inductive means is connected to the component via an electrical connection and is mounted on the means of transportation adjacent to one of the transponder and the safety component.

8. The component replacement warning system of claim 1, wherein the electronic authorization verification device is provided with the communication means in the component and blocks the electronic function of the component if one of an unauthorized transponder and a safety component transmits a query/response signal.

9. The component replacement warning system of claim 2, wherein a microchip is arranged on the component, said microchip having an electronic authorization verification device and a communication means whereby, as a function of the test signal, a determination is made as to whether the transmitting transponder or the safety component is the transponder or whether the safety component is authorized for the means of transportation.

10. The component replacement warning system of claim 2, wherein the transponder transmits said test signal with a transponder recognition and wherein the electronic authorization verification device that is assigned to the component determines whether the transponder recognition agrees with the transponder recognition registered as being authorized.

11. The component replacement warning system of claim 3, wherein the communication means connected to the component contains an inductive device, which includes an oscillating circuit which generates an electromagnetic signal.

12. The component replacement warning system of claim 4, wherein the communication means connected to the component contains an inductive device, which includes an oscillating circuit which generates an electromagnetic signal.

13. The component replacement warning system of claim 2, wherein the electronic authorization verification device is provided with the communication means in the component and blocks the electronic function of the component if one of an unauthorized transponder and a safety component transmits a query/response signal.

14. The component replacement warning system of claim 3, wherein the electronic authorization verification device is provided with the communication means in the component and blocks the electronic function of the component if one of an unauthorized transponder and a safety component transmits a query/response signal.

15. The component replacement warning system of claim 4, wherein the electronic authorization verification device is provided with the communication means in the component and blocks the electronic function of the component if one of an unauthorized transponder and a safety component transmits a query/response signal.

16. The component replacement warning system of claim 5, wherein the electronic authorization verification device is provided with the communication means in the component and blocks the electronic function of the component if one of an unauthorized transponder and a safety component transmits a query/response signal.

17. The component replacement warning system of claim 6, wherein the electronic authorization verification device is provided with the communication means in the component and blocks the electronic function of the component if one of an unauthorized transponder and a safety component transmits a query/response signal.

18. The component replacement warning system of claim 7, wherein the electronic authorization verification device is provided with the communication means in the component and blocks the electronic function of the component if one of an unauthorized transponder and a safety component transmits a query/response signal.

* * * * *